J. BURKE.
METHOD OF FORMING COILS FOR ARMATURE WINDINGS.
APPLICATION FILED DEC. 29, 1906.

979,375.

Patented Dec. 20, 1910.

Witnesses:
J. K. Sager.
Geo. N. Kerr.

James Burke Inventor
By his Attorney C. V. Edwards

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

METHOD OF FORMING COILS FOR ARMATURE-WINDINGS.

979,375.  Specification of Letters Patent. Patented Dec. 20, 1910.

Application filed December 29, 1906. Serial No. 349,940.

*To all whom it may concern:*

Be it known that I, JAMES BURKE, a citizen of the United States, residing at Erie, in the county of Erie and State of Pennsylvania, have invented certain new and useful Improvements in Methods of Forming Coils for Armature-Windings, of which the following is a full, clear, and exact specification.

My invention relates to dynamo-electric machines, and particularly to an improved method of forming the coils for armature windings.

In making up the windings for the armature of a dynamo it is usual to prepare formed coils, all similar to each other, which are then applied to the armature core and properly connected. This method has greatly simplified the construction of armatures but has involved considerable labor and expense in making the formed coils. These are sometimes made by winding the coil upon a form which gives the coil its exact final outline or they are sometimes first wound in some simple outline and afterward given their final form by being heated and molded in forms under pressure. In each case the method is comparatively costly, requiring considerable labor and a form more or less expensive for each size and type of winding.

By my invention I secure the advantages in the use of formed coils and overcome the objections above mentioned.

My invention is particularly applicable to bi-polar windings or to windings in which the conductors of any one coil are approximately diametrically opposite, and in the following description such a winding is referred to.

Figure 1:
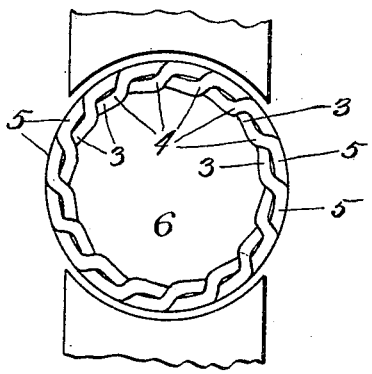
Figure 2:
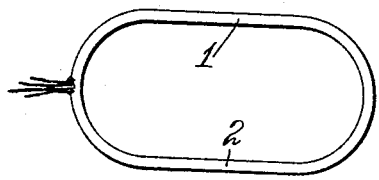
Figure 3:
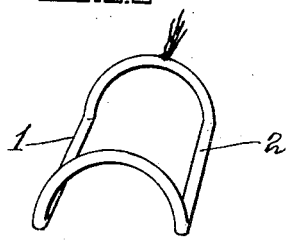
Figure 4:
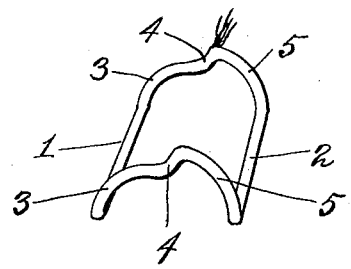

In the accompanying drawings, Figure 1 is an end view of an armature showing the end turns of a winding formed according to my invention; Figs. 2 to 4 inclusive are perspective views of a coil showing the steps in forming the same.

Referring to Figs. 1 and 4, it will be seen that the coil comprises two main parts 1, 2 adapted to engage or seat in the slots of the armature core 6. It will also be noted that the two end parts or connections of each coil are similar to each other, and the two ends of the completed armature will have a similar appearance. The coil at each end consists of a part 3 which extends circumferentially near the cylindrical surface of the core and slightly outwardly; it then has an offset 4 toward the axis and another part 5 extending circumferentially and slightly inward toward the core to the main part 2. It will be seen from Fig. 1 that the form of the end turns is such that they fit neatly within each other and are well adapted to be forced into place on the core.

In making the form of coil shown in Fig. 4, I first form the conductor, or wind the wires comprising the same, into a flat coil having the straight main parts 1, 2 at approximately the same distance apart as they occupy when in place on the core, and the said flat coil is also provided with rounded ends substantially in the form of a semi-circle. Preferably the coil will be suitably insulated while in this form, but if desired insulation may be later applied. The next step in forming the coil is to bend the two rounded ends substantially at right angles to the main parts 1, 2, as shown in Fig. 3. The coil is then bent at the ends to form the offsets 4 as shown in Fig. 4. These offsets may be made in any desired manner, either simultaneously or successively. A simple way is to indent the ends by the blow of a hammer against a piece engaging the coil, the part of the coil to be indented being bridged across supporting parts. After this operation is performed, each end portion will lie substantially in a single plane and then the middle part of each end portion may be pulled slightly outwardly from the center of the coil, or this may be done while applying the windings to the core so as to properly overlap each other.

While I have shown and described one method of making the coil, it will be understood that I am not limited to the precise method described for making the same; also that the invention may be applied to coils for the stationary part when this type of winding is used, as well as to coils for the rotating part.

Having thus described my invention, I declare that what I claim as new and desire to secure by Letters Patent, is,—

1. The method of making a formed coil for dynamo-electric machines, which consists in forming a flat coil, bending both ends out of the plane of the main portion and to the same side thereof, and then forming offsets in the ends.

2. The method of making a formed coil for dynamo-electric machines, which consists in forming a flat coil, bending the ends at approximately right angles to the main portion, and then forming offsets in the ends.

3. The method of making a coil of certain predetermined dimensions and form for dynamo electric machines, which comprises forming a flat coil with the main parts of predetermined distances apart, then while maintaining said predetermined distances, bending the end portions to the predetermined form desired in one direction and then bending the end portions in a different direction.

In testimony whereof I affix my signature, in presence of two witnesses.

JAMES BURKE.

Witnesses:
L. R. SAGER,
GEO. N. KERR.